Patented Jan. 9, 1945

2,366,737

UNITED STATES PATENT OFFICE 2,366,737

1,3-DIOXOLANE MODIFIED ORGANIC PRODUCTS

Donald John Loder and William Franklin Gresham, Wilmington, Del., assignors to E. I. du Pont de Nemours & Company, Wilmington, Del., a corporation of Delaware No Drawing. Application May 27, 1941,
Serial No. 395,366

30 Claims. (Cl. 260—410.6)

This invention relates to a process for the preparation of oxygenated organic compounds and more particularly to the preparation of polymeric compounds from 1,3-dioxolane and organic acidic compounds as well as to the compounds thus obtained.

An object of the present invention is to provide new reaction products obtained from 1,3-dioxolane and its substitution products with other organic compounds. Another object of the invention is to provide new compositions of matters from 1,3-dioxolane, or its substitution products, and organic acids, their esters, and dehydration products. Yet another object is to provide a process for the interaction of 1,3-dioxolane or its substitution products with mono or polycarboxylic acids and their derivatives. Another object is to provide reaction conditions and catalysts for such reactions whereby valuable products are obtainable. Other objects and advantages of the invention will hereinafter appear.

The products of the invention are obtained by reacting 1,3-dioxolane, substituted 1,3-dioxolane or their polymers with carboxyl-containing compounds such, for example, as:

1. Monocarboxylic aromatic and aliphatic organic acids,
2. Polycarboxylic aromatic and aliphatic organic acids,
3. Mono and polyhydroxyaliphatic and aromatic carboxylic acids,
4. Substituted carboxylic acids containing at least one carboxyl group, and
5. Esters and dehydration products of the above acids.

In accord with the present invention, valuable products are obtained by reacting a monocarboxylic acid with 1,3-dioxolane which products may have the generic formula $$RCO(OCH_2OCH_2CH_2)_xOH$$

and or $RCO(OCH_2CH_2OCH_2)_xOR_1$ in which $x$ is an integer and and R and $R_1$ are alkyl, substituted alkyl, aryl, or substituted aryl group, such, for example, as methyl, ethyl, propyl, butyl, amyl, and the higher alkyl groups, such as dodecyl, stearyl, cetyl, ceryl, etc.; phenyl, tolyl, salicyl, etc.; the alkoxy alkyls, such as methoxy methyl, methoxymethoxy methyl, ethoxy methyl, and so forth; hydroxy methylene, hydroxy ethylene, methyl hydroxy ethylene, etc.; and in fact any substitution in the R position. $R_1$ may also be hydrogen. Similarly, from 1,3-dioxolane and dicarboxylic acids valuable products are obtained which may be designated by the following formula:

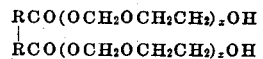

wherein $x$ is an integer and the R groups are similar to those designated above except that they are divalent. Similarly, polycarboxylic acids may be reacted to give corresponding products. If esters are reacted instead of acids an alkyl group will in many instances be substituted for the terminal hydrogen atoms in the above formula.

When 1,3-dioxolane is reacted with the higher molecular weight acids such as stearic acid, palmitic acid and the like, the reaction goes smoothly and with no apparent decomposition of the reactants or products to formaldehyde. When somewhat stronger acids are reacted there is a tendency to form formaldehyde. This may be explained by assuming that concurrently with the formation of the above products the following reactions occur (acetic acid being used by way of example):

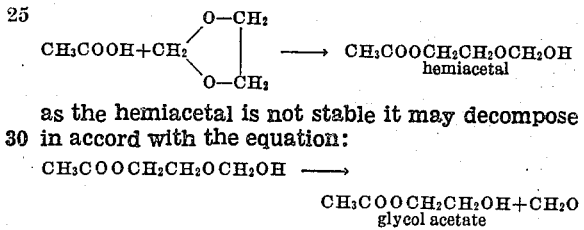

as the hemiacetal is not stable it may decompose in accord with the equation:

$CH_3COOCH_2CH_2OCH_2OH \longrightarrow$ $CH_3COOCH_2CH_2OH + CH_2O$
glycol acetate If 1,3-dioxolane is present in excess it will react with the glycol ester as follows:

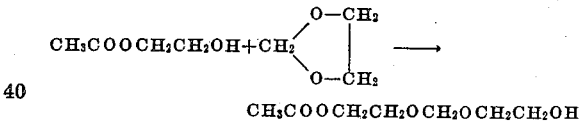

$CH_3COOCH_2CH_2OCH_2OCH_2CH_2OH$

In a similar manner higher molecular weight compounds are prepared by the addition of more 1,3-dioxolane groups.

It is possible that the products described above have either a linear or cyclic form or both, and it will furthermore be understood that there is good theoretical foundation for the chemical structures shown herewith but the description, by formulas and by reactions, is given by way of illustration and not by way of limitation.

The high molecular weight products will hereinafter be referred to as polymers which term will include all products designated in the above formulas, and the products resulting from the reactions given, containing at least two 1,3-dioxolane groups and the products which they illustrate. In other words, the term will include all products containing at least two 1,3-dioxolane residues, which residues have the structure (1) —CH$_2$OCH$_2$CH$_2$O—, (2) —CH$_2$OCH$_2$CH$_2$OH, or (3) CH$_2$CH$_2$OCH$_2$OH, the residues (2) and (3) are at the end of the polymer chain, while (1) is within the chain. The substituted 1,3-dioxolane residues will have a similar configuration with the exception that one or more of the hydrogens designated will be substituted.

The acids and their esters and dehydration products may be reacted, in accord with the invention which will be more fully particularized hereinafter, with 1,3-dioxolane which has the chemical formula with numbering as shown,

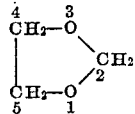

which cyclic glycol formal may be obtained by reacting formaldehyde with ethylene glycol. Products with substitutions in the two position can be readily obtained by reaction of ketones or other aldehydes either aliphatic or aromatic with ethylene glycol. Thus, by way of example, many compounds are obtained which may be employed in accord with the invention, such as 2-methyl-1,3-dioxolane, 2-ethyl-1,3-dioxolane, 2,2-dimethyl-1,3-dioxolane, 2,2-diethyl-1,3-dioxolane, 2-phenyl-1,3-dioxolane, 2,2-methylphenyl-1,3-dioxolane, and higher dioxolanes substituted in like manner which may, for example, be obtained from ethylene glycol and acetaldehyde, propanal, acetone, diethyl ketone, benzaldehyde, methyl phenyl ketone, and higher substituted aldehydes respectively. The invention likewise contemplates the use of 1,3-dioxolanes substituted in the 4 and/or 5 positions. These 1,3-dioxolanes are obtained by the interaction of substituted 1,2-glycols with aldehydes, for example, 1,3-propylene glycol+formaldehyde will give 4-methyl-1,3-dioxolane and similarly the following dioxolanes can be readily prepared from formaldehyde and the corresponding glycols: 4-ethyl-1,3-dioxolane, 4-propyl-1,3-dioxolane, 4,5-dimethyl-1,3-dioxolane, and the like. The invention contemplates the inclusion of the polymers of 1,3-dioxolane as are described in the copending application of W. F. Gresham, A. D. 952, which products can be reacted with the acidic reactant in accordance with the procedural details fully particularized hereinafter for the reaction of 1,3-dioxolane. In fact all 1,3-dioxolanes substituted or unsubstituted monomeric or polymeric may be used in accord with the invention and for convenience dioxolane will be the word used to include generally the substituted, unsubstituted, and polymeric dioxolanes.

Dioxolane can be combined in accord with the invention with: (1) monocarboxylic aliphatic acids, such, for example, as: formic, acetic, propionic, n- and iso-butyric, n- and iso-valeric acid, trimethyl acetic and the higher acids of this class, such as, for example, capric, lauric, myristic, palmitic, stearic, metissic acids, etc.; the hydroxy substituted acids of this class such, for example, as: hydroxyacetic, hydroxypropionic, lactic acids and their dehydration products such as glycolid, glycolic anhydride, diglycolic anhydride, lactid, etc.; the alkoxy substituted acids of the class such, for example, as: methoxy-, ethoxy-, propoxy-, methoxymethoxy-, ethoxymethoxy-acetic, propionic and higher like substituted acids; and the unsaturated acids such, for example, as: acrylic, α-substituted acrylic, (e. g., methacrylic), butenic, angelic, tiglic, oleic, ricinoleic, elaidic, erucic acids, etc.; (2) the monocarboxylic aromatic acids, such, for example, as: benzoic, phenyl-acetic, o-, m-, and p-tolyic, hydrocinnamic, o-, m-, p-tolyl acetic, o-, m-, p-ethyl benzoic and mesitylenic acids; the substituted acids of the class such, for example, as: salicylic, meta and para hydroxy-benzoic, mandelic, tropic, oxybenzoic, and anisic acids and the unsaturated acids such, for example, as: cinnamic, atropic, phenyl-propiolic, and coumaric acids; (3) the carboxylic aliphatic acids such, for example, as: oxalic, malonic, succinic, glutaric, adipic, pimelic, camphoric acids, etc.; the hydroxy substituted acids of the class such, for example, as: tartronic, malic, tartaric, racemic and other acids of this class such, for example, as: maleic, fumaric, trihydroxyglutaric, saccharic, mucic, isosaccharic, mesoxalic, oxal-acetic, acetone dicarboxylic, dihydroxy-tartaric, and diaceto-succinic, tricarbolylic, and citric acids; (4) the polycarboxylic aromatic acids such, for example, as: o-, m-, p-phthalic, hydrophthalic, 2,5-dihydroxy-terephthalic, and mellitic acids; and (5) such acids as: cyanacetic, sulfanilic, tannic and thioacetic acids; the ketone acids; pyruvic, phthalonic, levulinic, the acyl substituted acids, acetoxy, acetic, propionic, and butyric acids. The esters and polymers of the invention may also be made from the esters and dehydration products of the above acids, such as the anhydrides, polyacids, etc. Saturated and unsaturated fatty acid oils may likewise be reacted with the dioxolanes and, by way of example, there are included: cotton seed, rape, sesame, beech-nut, linseed, poppy, sun flower, palm nut, coconut, tall, soybean, China-wood, corn, castor, and oiticica oils, as well as the triglycerides, tripalmitics, tristearics, etc. For convenience this reactant will hereinafter be referred to as the acidic reactant.

The products of the invention can be prepared by the interaction of dioxolane with the acidic reactant in the presence of a suitable acidic type catalyst. It is not necessary that there be present equimolecular proportions of the dioxolane and the acidic reactant for it has been found that valuable products are obtainable when small amounts of the 1,3-dioxolane or its derivatives are used, say down to as low as one part thereof per 99 parts of the acidic reactant. The influence of the dioxolane on the resulting product, of course, will not be as great when it is used in low concentrations. Dioxolane may likewise be in excess to give a marked change in the properties of the resulting product. For example, the water-insoluble acidic reactants and generally those organic acids and esters having more than eight carbon atoms can be converted to water-soluble products if a sufficient number of dioxolane groups are added. By varying the amount of dioxolane reacted, products can be obtained ranging from water-solubility to complete miscibility in water. Dehydration products of the acid, such as the polymeric acids; e. g. glycolids and lactids, etc., can be reacted in accord with this procedure to obtain products with valuable solubility characteristics.

The reaction can be effected at the temperatures ranging between —80 and 300° C. and preferably between 0 and 150° C. Atmospheric, subor superatmospheric pressures may be used, and if the last, pressures may range between 1 and 1000 atmospheres or higher. Normally excellent results are obtained at or about atmospheric pressure. If desired, the temperature of the reaction, especially when carried out at the boiling point of the reaction mixture, may be controlled by varying the pressure on the boiling reactants.

It has been found advantageous to carry out the reaction in the presence of an acidic type catalyst, such, for example, as sulfuric acid, phosphoric acid; the halogen acids, such as hydrochloric acid, hydrofluoric acid (alone or with $BF_3$); boron fluoride (including its complexes with water, acids, esters, alcohols, and the like), paratoluene sulfonic acid, camphor sulfonic acid, and other acid catalysts of this general nature. Friedel-Crafts type catalysts other than $BF_3$ may be used, such as $AlCl_3$, $AlBr_3$, $FeCl_3$, and so forth, as well as inorganic acids generally and their acid salts such as sodium acid sulfate, sodium acid phosphate, and so forth.

The catalyst may be supported or not on inert supports such as charcoal, silica gel (which alone is a catalyst for the reaction), kieselguhr, and so forth. Concentration of $BF_3$, $H_2SO_4$ and similarly strong catalysts may be extremely low; less than 0.1%, and amounts down to as low as 0.001% of the strong acid catalysts have been found sufficient to give esters and polymers although high concentrations of the catalyst even equal to or greater than the weight of the dioxolane are likewise satisfactory.

The reaction is preferably conducted approximately to equilibrium in order to obtain the desired products. The reaction may then be stopped by destroying the catalyst. This may be done by removing it (in the case of silica gel, kieselguhr, and the like) or by treating the reaction mixture with an inorganic base, such as ammonia, alkali metal, and alkaline earth metal hydroxides, carbonates, alkoxides, and so forth or an organic base, such as pyridine, dimethylamine, and the like. These bases are added in sufficient amounts to neutralize the catalyst when acid catalysts are used, and the unconverted reactants may be removed by distillation under reduced pressures. As soon as the catalyst has been neutralized, the reaction ceases. The neutralized catalyst may be filtered off and the polymerized product which remains treated for the recovery of the polymers.

In the reaction of the dioxolane with the acids and esters and more especially 1,3-dioxolane with the acids and esters to give polymers, there will usually be found in the reaction mixture along with the polymer, unreacted dioxolane and acid or ester, together with by-products and polymers which it is not desired to produce. It is possible to inhibit the formation of the undesired products by carrying out the process in an intermittent or continuous manner whereby the desired polymer is withdrawn from the reaction zone and the undesired products, after being separated therefrom, are returned to the reaction zone. By this means, it is possible to obtain high yields of the desired product.

In addition to being instrumental in stopping the reaction at a desired point, the neutralization of the catalyst tends to stabilize the esters and polymers. It follows, therefore, that for high temperature uses, no acid should be present in the polymers, and they should preferably be neutral or on the alkaline side.

Examples will now be given illustrating the embodiments of the invention but it will be understood that it is not to be limited by the details thereof. Parts are by weight unless otherwise indicated.

*Example I.*—A reaction mixture was prepared by mixing 71 parts of stearic acid, 740 parts of 1,3-dioxolane and 4 parts of $H_2SO_4$. This was heated on a steam bath for five hours and as the reaction proceeded the mixture increased in viscosity with boiling ceasing at the end of one hour. The sulfuric acid catalyst was neutralized with anhydrous $NH_3$ to blue litmus followed by 3.4 parts NaOH in 12 parts of $H_2O$. At 1 mm. and 100° C. unconverted dioxolane, 104 parts was separated. The residue was dissolved in benzene and salts removed by filtration. Benzene was removed under reduced pressure and finally by blowing with air at 100° C. and atmospheric pressure 658 parts of a viscous liquid was obtained which was miscible with water, benzene and methanol. The viscous liquid product solidified on standing. Molecular weight 1280 (determined by the solution method).

Polymers having the properties shown were obtained in accord with the procedure of Example I by reacting 100 parts of 1,3-dioxolane with:

6.8 parts of ricinoleic acid
 Appearance: Brown soft solid soluble in benzene and water
 Analytical data: Hydroxyl No. 75.6, saponification No. 20.9
 Solubility: Soluble in benzene and water
 Molecular weight: 827 in boiling benzene
19.7 parts of adipic acid
 Appearance: Colorless viscous liquid
 Analytical data: Hydroxyl No. 131 saponification No. 164
 Solubility: Soluble in benzene
 Molecular weight: 700 in boiling benzene
6.85 parts of abietic acid
 Appearance: Brown soft solid
 Analytical data: Hydroxyl No. 30.2
 Solubility: Soluble in benzene and water
 Molecular weight: 1396 in boiling benzene
7.76 parts of naphthenic acid (molecular weight, 230.1)
 Appearance: Light brown viscous liquid
 Analytical data: Hydroxyl No. 37.4 saponification No. 16.7
 Solubility: Soluble in benzene and water
 Molecular weight: 1750 in boiling benzene
4.6 parts of sebacic acid
 Appearance: Colorless solid
 Analytical data: Hydroxyl No. 21.4
 Solubility: Soluble in benzene
 Molecular weight: 1284 in boiling benzene
6.08 parts of malic acid
 Appearance: Slightly colored viscous liquid
 Analytical data: Hydroxyl No. 148. Saponification No. 55
 Solubility: Soluble in benzene and water
 Molecular weight: 1100 in boiling benzene

*Example II.*—A mixture consisting of 56.8 parts of stearic acid, 296 parts of 1,3-dioxolane and 0.2 part of $BF_3$ was processed 5 hours on the steam bath followed by 10 days at 18–22° C. The colorless solid product so produced was added in small pieces to excess benzene containing 10 parts of pyridine and the mixture warmed to effect solution. Removal of the diluent from the filtered solution by a stripping process under a reduced pressure of about 2 mm. gave 300 parts of a colorless solid stearic acid-1,3-dioxolane polymer melting at 54.5-56.8° C. This polymer was soluble in water. Its aqueous solution exhibited strong surface-active properties.

*Example III.*—To a mixture of 200 parts of lauric acid and 2.2 parts of boron trifluoride at 100° was added, dropwise with stirring, 1554 parts of 1,3-dioxolane. The mixture was stirred at 100° for about 7 hours. The catalyst was neutralized by adding 5.3 parts of sodium hydroxide in 10 parts of water. Unreacted 1,3-dioxolane was removed under reduced pressure using a pot temperature of 100° and a pressure of about 2 mm. The final product, a yellow, viscous liquid was water and acetone soluble (total $CH_2O + 31.7\%$; OH number = 45) and had a molar ratio of acid to combine dioxolane of 1:14.7.

*Example IV.*—A mixture consisting of 100 parts of lauric acid, 777 parts of dioxolane and 4.5 parts of sulfuric acid was allowed to stand at room temperature for 8 days. At the end of this period, ammonia was added to blue litmus 3.8 parts of sodium hydroxide in 10 parts of water was then added to completely neutralize the catalyst and the unreacted 1,3-dioxolane was removed under a reduced pressure of 2 mm. using a pot temperature of 100°. The final product, a yellow, viscous liquid, was water and acetone soluble (total $CH_2O = 32.4\%$; OH No. = 22) and had a ratio of acid to combined 1,3-dioxolane of 1:18.

*Example V.*—A reaction mixture comprising 71 parts of ethyl palmitate, 740 parts of 1,3-dioxolane and 4 parts of $H_2SO_4$ was heated under a return condenser on a water bath for 17.5 hours. The reaction mixture was cooled and $NH_3$ added to blue litmus followed by 4.5 parts NaOH in 15 parts $H_2O$. Unchanged dioxolane, 155 parts, was separated by a stripping process at about 2 mm. and 100° C. The product in benzene was filtered to remove $Na_2SO_4$ and after separation of benzene at 1 mm. and 100° C. 563 parts of ethyl palmitate 1,3-dioxolane polymer was obtained which is a light brown, viscous liquid miscible with water, benzene and methanol. Molecular weight 845.

Polymers having the properties shown were obtained in accord with the procedure of Example I by reacting 100 parts of 1,3-dioxolane with:

10 parts of methyl acetate
   Appearance: Colorless viscous liquid
   Analytical data: Saponification No. 15.6
   Solubility: Soluble in benzene and water
   Molecular weight: 591 in boiling benzene
13.5 parts of methyl methacrylate
   Appearance: Brown solid
   Analytical data: Saponification No. 4.2
   Solubility: Soluble in benzene
   Molecular weight: 1770 in boiling benzene
40.5 parts of methyl hydroxyacetate
   Appearance: Colorless somewhat viscous liquid
   Analytical data: Saponification No. 196
   Solubility: Soluble in water and benzene
   Molecular weight: 336 in boiling benzene

*Example VI.*—A mixture consisting of 117 parts of castor oil, 740 parts of 1,3-dioxolane and 4.2 parts of sulfuric acid was heated on a water bath with a return condenser for six hours. The reaction mixture became viscous and boiling ceased after three hours. Sulfuric acid was neutralized with anhydrous $NH_3$ to blue litmus followed by 3.8 parts of NaOH in 10 parts of water. Subsequent to removal of 210 parts of unchanged dioxolane, at 100° C. and 1 mm. pressure, the viscous liquid product was dissolved in benzene and filtered to separate sodium sulfate. The benzene solvent was removed under reduced pressure and 597 parts of castor oil 1,3-dioxolane polymer was obtained. It is a light brown, viscous liquid miscible with water, benzene and methanol. Molecular weight, 1020.

Polymers having the properties shown were obtained in accord with the procedure of Example VI by reacting 100 parts of 1,3-dioxolane with:

10.2 parts of tall oil
   Appearance: Reddish brown soft solid
   Analytical data: Hydroxyl No. 70.3. Saponification No. 20.1
   Solubility: Soluble in benzene and water
   Molecular weight: 1135 in boiling benzene
9.6 parts of sperm oil
   Appearance: Brown soft solid
   Analytical data: Saponification No. 20.9
   Solubility: Soluble in water and benzene.
   Molecular weight: 827 in boiling benzene

*Example VII.*—A reaction mixture containing 76 parts of polyhydroxyacetic acid (M. P. 148–149°), 740 parts of 1,3-dioxolane and 4 parts of $H_2SO_4$ was heated 7 hours on a steam bath with stirring. Most of the polyhydroxyacetic acid dissolved. The mixture was heated for an additional 4 hours with no apparent change. 75 parts of 1,3-dioxolane containing 3.5 parts of $H_2SO_4$ was added to the mixture and heating continued at the same temperature for 3 hours. Substantially all of the polyhydroxyacetic acid dissolved. Sulfuric acid catalyst was neutralized with caustic. Unchanged 1,3-dioxolane, 74 parts, was stripped off at about 1 mm. and 100° C. 817 parts of an odorless viscous liquid product containing suspended salts and a small quantity of unconverted polyhydroxyacetic acid was obtained. These were removed by centrifuging a benzene solution. The viscous polyhydroxyacetic acid poly 1,3-dioxolane was miscible with water. In boiling benzene the polymer had a molecular weight of 1410.

Polymers having the properties shown were obtained in accord with the procedure of Example VII by reacting 100 parts of 1,3-dioxolane with:

6.5 parts of citric acid
   Appearance: Colorless viscous liquid
   Analytical data: Hydroxy No. 136. Saponification No. 47
   Solubility: Soluble in water and benzene
   Molecular weight: 1007 in boiling benzene
6.75 parts of tartaric acid
   Appearance: Colorless viscous liquid
   Analytical data: Hydroxyl No. 201. Saponification No. 55
   Solubility: Soluble in benzene and water
   Molecular weight: 1130 in boiling benzene The esters and polymers of the invention are non-polar, surface-acting agents and are generally applicable for use where agents of this nature are required.

In cotton and linen processing the products of the invention are particularly useful for wetting of raw stock to reduce fly in carding; in wetting out of skeins, packages, beams, warps, and chain warps; as wetting agent for dyeing with inorganic salts as iron and chromium salts; and as agents to increase the absorbency of towels, face cloths, mops, and cleaning cloths generally. In the cotton and linen processing they are likewise applicable for use as assistants in, oiling of raw stock, kier boiling, and bleaching; as penetrants in mercerizing caustic solutions; as assistants in shrink setting finishing; as aids in dyeing; and as dispersing agents for vat and sulfur dyes.

In wool processing these compounds are particularly adapted for raw wool scouring; as ingredients of fulling soap to aid rinsing and of mineral oils to improve removal from fabric; as assistants in carbonizing, to improve neutralization after carbonizing, in acid fulling, in Vigoreaux printing, in dyeing with wool colors, in felting, and in dyeing of hat felts; and they may likewise be used in the finishing of wool to give soft hand.

The esters and their polymers of the application are likewise suitable for use in rayon processing and may be used as assistants to aid in improving penetration in regenerated cellulose process rayon manufacture; as assistants for desulfurizing rayon; as agents to prevent crater formation in spinnerets, use in nylon and regenerated cellulose process spinning; as penetrants for rayon size; as assistants for creping and finishing woven and knit goods, and for use in dyeing with all types of colors.

In the cellulose acetate, regenerated cellulose, silk, nylon and the artificial filament and fabric processing the products of the invention may be employed as assistants in soaking of raw fibers, in degumming of silk, in tin weighting and silicating of silk, and in removal of oil and graphite stains as well as kaumagraph marks. They likewise may be used in the conditioning of silk, dyeing of silk and polyamides, and in the rewetting of splash proof hose prior to boarding.

In the processing of other fibers they are likewise useful in scouring and dyeing of jute, straw, and hair; as penetrants of straw hats for bleaching; as aids in feather washing; as penetrants of "Cellophane" wrapped straws; and as dispersing agents for resins in moth-proofing compounds.

In the manufacture of leather the esters and polymers may likewise be used as assistants in solvent degreasing of skins, in the bateing process, in leveling and dyeing as penetrants, in fat liquoring of leather, in alum or in chrome and alum treatments of white leather; as wetting agents in the glazing of skins for recoloring and for the treatment of back dried skins and crusted leather; in the cleaning of leather prior to tanning; and as agents for solubilizing and dispersing vegetable tanning materials. In the fur industry, the products may be used as assistants in dyeing with intermediates; and as oxidizing agents, in alum tannage of skins, and in degreasing of skins with solvents.

In the petroleum industry, the products of the invention may be used as penetrants in acid treatment of oil wells; as assistants in flooding waters for recovery of petroleum from oil bearing sands; and as assistants in breaking crude oil-brine emulsions.

For use in the paper industry, the esters and polymers may be employed as assistants in, cooking rags, better sizing with clay and alum, calender sizing and coloring, making transparent or glassine paper, and preparing fireproof paper. They may be used in washing of paper and board mill felts; in neutral, alkaline, and acid washing baths in treating mill felts; as agents in the deinking of paper stock; and to increase absorbency of paper towels, blotting papers, facial tissue, and the like; and as a pitch dispersing agent for beaters.

In the metal industry the esters and polymers may be used as wetting agents for acid and alkaline cleaning with or without solvent emulsions, and especially for use prior to enameling and lacquering; as wetting agents in lime baths to quench the pickle. They may be used as assistants to remove drawing grease from small metal parts, in wire drawing, in electrolytic pickling baths especially to give a foam blanket therein; as addition agents to lime for drawing steel bars; as ingredients in buffing compounds, sodium silicate flux for welding rods, and soldering fluxes generally; as addition agents in electroplating baths, such as, nickel, tin, copper, gold, silver, zinc and cadmium; as anti-pitting agents for bright nickel and bright copper plating; and as emulsifying agents for coating aluminum with wax.

In the paint industry, the polymers and esters are applicable for use as ingredients in casein cold water paints, lacquer emulsions, such as nitrocellulose emulsions, caustic paint stripping baths, and lacquers to prevent blocking off of paper; as wetting agents for wet sanding automobile body finishes; and as assistants in metallized surface coating, especially of paper.

In the laundry and dry cleaning industry and for such uses generally the water-soluble polymers are particularly applicable for use as wetting agents and detergents and may be used in washing compositions for use on automobiles, busses, railroad cars, and the like, and as wetting agents generally. They may also be used for acid cleaning of bricks; as foaming agents for household hypochlorite bleach; as cleaning agents for spun glass air filters; and as addition agents to soaps to give dispersion of the insoluble salts present or to prevent their formation. The products may likewise be used as ingredients in radiator cleaners, denture cleaners, shoe cleaners, dry cleaning soaps, dish washing compounds, household alkali cleaners, household ammonia, glass cleaners, spot removers, laundry blueing, sterilizing compounds for dish washing, paint cleaner, acid porcelain cleaners, and milk bottle cleaners for mechanical washers.

The products likewise have utility in agricultural uses and particularly as wetting agents in insecticidal and fungicidal sprays; as ingredients of acid or alkaline fruit washing compositions, especially for removing spray residues; and as emulsifying agents in all types of sprays.

In the cosmetic industry the surface acting, non-polar products of the invention may be employed as emulsifying agents in lotions and creams and as ingredients in brushless shaving cream, depilatory cream, hair wave lotion, foaming bath salts and water softeners, hair dye preparations, shampoos, bubble bath preparation, and in dentifrices of the liquid, paste or powder form.

The esters and polymers of the invention may be used as wetting, dispersing, spreading, and emulsifying agents in the ceramic industry, for injection moulding mixes and in the preparation and use of paint, pigments, and pastes in printing, painting, etc., as assistants for pigment grinding with bentonite; as ingredients of cement to improve grinding and setting; as assistants in the preparation of slips of refractories; and as foaming agents to increase bulk in manufacture of mineral wool insulation, bricks, wall boards, and thermal insulation of cements. As dispersing and spreading agents they are especially useful in the preparation and use of dyes.

In the rubber industry the products of the instant case may be used as penetrants in acid processes for the reclaiming of rubber; as mould lubricants for rubber articles; as agents to prevent adhesion of milled rubber; as foaming agents in the manufacture of sponge rubber articles; and in latex compounding for: wetting of insoluble fillers, as channel black, clay, whiting, and blanc fixe; as an assistant in the incorporation of immiscible liquids in emulsion form; stabilization of latex emulsions against mechanical or chemical action; as plasticizers and softeners for rubber and elastomers generally and improving impregnation characteristics of rubber latex for use in the preparation of fabrics for coatings and the like.

The 1,3-dioxolane polymers and esters of the acids and anhydrides may be used generally as wetting agents for use in pigments, dry colors, embalming fluids, with calcium chloride for laying mine dust, in air-conditioning systems, photographic developer baths, in inks, in preventing fogging of safety glass, in wall paper removers, in household dye preparations, and as wetting agents for dry powdered foods such as baby foods and cocoa; in printing compositions for linoleum and in tobacco leaves, especially for use in cigar wrapper leaf. The polymers may likewise be employed as ingredients of printing ink for offset printing, in fly paper and fly killers, and in lacquer printing compositions. The esters and polymers may likewise be employed as assistants in settling inorganic slimes; for the control of crystal growth and formation of aggregates; for control of thixotropy in paints; for preservation of green fodder; as spreading agents in adhesives; as assistants in the preparation of lake colors; and for stripping dyestuffs from fibers; as assistants in rug shampoo; and as assistants in, regenerating zeolite systems for soft milk, etching solutions for photo-engravers, and application to surfaces to give adherence to poured concrete. The products of the invention may likewise be used as dispersing assistants for pigments and printing inks; as foaming agents in air-foam type fire extinguishers; as penetrants in the manufacture of asphalt roofing paper; as ingredients in wood stains, and in creosoting liquors for use in preserving wood; and as emulsifying agents they are suitable for use in the dispersion and extension of oils and waxes; as polishers; as emulsifying agents in salad dressings; as flotation agents in ore treatment; as assistants in drilling muds to control thixotropy and settling properties; as a dispersing or sequestering agent for iron, chromium and aluminum salts in leather processing, as leather softeners for cellulose nitrate, cellulose acetate, cellulose aceto butyrate, polymeric methyl methacrylate, polymeric methylacrylate and other polymeric esters and interpolymers of acrylic and substituted acrylic acids, polyvinyl acetate, polyvinyl chloride and synthetic resins generally.

We claim:

1. In a process for the preparation of a modified organic compound selected from the group consisting of organic acids, their esters and anhydrides, the modification consisting in a chemically combined 1,3-dioxolane residue there being present at least one, the step which comprises reacting 1,3-dioxolane wtih a compound selected from the group consisting of organic acids, their esters and anhydrides in the presence of an acid catalyst.

2. The process of claim 1 conducted at a temperature between —80 and 300° C.

3. The process of claim 1 conducted with sulfuric acid as the catalyst.

4. The process of claim 1 conducted with boron fluoride as the catalyst.

5. In a process for the preparation of a modified organic acid ester, the modification consisting in a chemically combined 1,3-dioxolane residue there being present at least one, the step which comprises reacting 1,3-dioxolane and an organic acid ester in the presence of an acid catalyst.

6. In a process for the preparation of a modified glyceride, the modification consisting in a chemically combined 1,3-dioxolane residue there being present at least one, the step which comprises reacting 1,3-dioxolane with a glyceride in the presence of an acid catalyst.

7. A process for the preparation of a modified aliphatic organic acid which comprises reacting 1,3-dioxolane and an aliphatic organic acid in the presence of an acid catalyst whereby a compound having the chemical formula $$RCO(OCH_2OCH_2CH_2)_xOH$$

is obtained in which R is an aliphatic group and $x$ is a positive integer greater than one.

8. A process for converting a water-insoluble organic compound to a water-soluble organic compound which comprises subjecting a water-insoluble organic compound containing a reactive hydrogen group to a reaction with 1,3-dioxolane in the presence of an acid catalyst and continuing the reaction until the water-insoluble organic compound has chemically combined with a sufficient number of 1,3-dioxolane groups to make it water-soluble.

9. A process for converting a water-insoluble organic compound to a water-soluble organic compound which comprises subjecting a water-insoluble organic compound containing a reactive hydrogen group to a reaction with 1,3-dioxolane at a temperature between —80 and 300° C. in the presence of an acid catalyst and continuing the reaction until the water-insoluble organic compound has chemically combined with a sufficient number of 1,3-dioxolane groups to make it water-soluble.

10. A process for converting a water-insoluble organic compound to a water-soluble organic compound which comprises subjecting a water-insoluble organic compound selected from the group consisting of organic acids, their esters, and anhydrides to a reaction with 1,3-dioxolane at a temperature between —80 and 300° C. in the presence of sulfuric acid as the catalyst, and continuing the reaction until sufficient 1,3-dioxolane groups are added to the compound of the group to render it water-soluble.

11. A process for converting a water-insoluble organic acid to a water-soluble organic product which comprises subjecting a water-insoluble organic acid to a reaction with 1,3-dioxolane at a temperature between —80 and 300° C. in the presence of an acid catalyst, and continuing the reaction until sufficient 1,3-dioxolane groups are added to the organic acid to render it water-soluble.

12. In a process for the preparation of a modified organic acid ester, the modification consisting in a chemically combined 1,3-dioxolane residue there being present at least one, the steps which comprise heating an organic acid ester and 1,3-dioxolane while in contact with an acid catalyst, when the reaction has proceeded to the desired extent destroying the effectiveness of the catalyst, and separating the product from the reaction mixture.

13. In a process for the preparation of a modified aliphatic organic acid, the modification consisting in a chemically combined 1,3-dioxolane residue there being present at least one, the steps which comprise contacting an organic acid and 1,3-dioxolane with an acid catalyst, when the reaction has proceeded to the desired extent, neutralizing the catalyst and separating the modified acid from the neutralized mixture.

14. In a process for the preparation of a modified stearic acid, the modification consisting in a chemically combined 1,3-dioxolane residue there being present at least one, the step which comprises contacting stearic acid and 1,3-dioxolane with an acid catalyst at a temperature between —80 and 300° C.

15. In a process for the preparation of a modified castor oil, the modification consisting in a chemically combined 1,3-dioxolane residue there being present at least one, the steps which comprise contacting castor oil and 1,3-dioxolane with an acid catalyst at a temperature between —80 and 300° C.

16. In a process for the preparation of a modified tall oil, the modification consisting in a chemically combined 1,3-dioxolane residue there being present at least one, the step which comprises contacting tall oil and 1,3-dioxolane with an acid catalyst at a temperature between —80 and 300° C.

17. In a process for the preparation of a modified stearic acid, the modification consisting in a chemically combined 1,3-dioxolane residue there being present at least one, the step which comprises contacting a mixture containing approximately 57 parts of stearic acid, approximately 396 parts of 1,3-dioxolane with approximately 0.2 part of boron trifluoride, heating the mixture at steam bath temperatures for approximately five hours, followed by reaction at room temperature for about ten days, subsequently neutralizing the catalyst with pyridine and finally recovering 1,3-dioxolane-stearic acid polymer from the resulting product.

18. In a process for the preparation of a modified castor oil, the modification consisting in a chemically combined 1,3-dioxolane residue there being present at least one, the steps which comprise contacting a mixture containing approximately 740 parts of 1,3-dioxolane and approximately 117 parts of castor oil with 4.2 parts of sulfuric acid at a temperature of approximately 100° C., subsequently neutralizing the catalyst with a base and recovering from the reaction product the 1,3-dioxolane-castor oil polymer.

19. In a process for the preparation of a modified tall oil, the modification consisting in a chemically combined 1,3-dioxolane residue there being present at least one, the steps which comprise contacting a mixture containing approximately 100 parts of 1,3-dioxolane, 10.2 parts of tall oil, with 4.2 parts of sulfuric acid at a temperature of approximately 100° C., after approximately three hours neutralizing the catalyst and subsequently recovering the 1,3-dioxolane-tall oil compound.

20. A modified organic compound selected from the group consisting of organic acids, their esters and anhydrides the modification consisting in a chemically combined 1,3-dioxolane residue there being present at least one.

21. A modified organic acid the modification consisting in a chemically combined 1,3-dioxolane residue there being present at least one.

22. A modified organic acid ester the modification consisting in a chemically combined 1,3-dioxolane residue there being present at least one.

23. A modified glyceride the modification consisting in a chemically combined 1,3-dioxolane residue there being present at least one.

24. A modified fatty oil, the modification consisting in a chemically combined 1,3-dioxolane residue there being present at least one.

25. An organic compound having the formula:

$$RCO(OCH_2CH_2OCH_2)_xOR_1$$

in which $x$ is a positive integer greater than one, R is an aliphatic group, and $R_1$ is selected from the group consisting of hydrogen, alkyl, aryl, and aralkyl groups.

26. An organic compound having the formula:

$$ACO(OCH_2OCH_2CH_2)_xOH$$

in which A is selected from the group consisting of alkyl, substituted alkyl, aryl, substituted aryl, cyclic and alicyclic groups, and $x$ is a positive integer greater than one.

27. A water-soluble reaction product consisting of 1,3-dioxolane and an aliphatic organic acid containing more than eight carbon atoms.

28. A reaction product consisting of stearic acid containing more than one 1,3-dioxolane residue.

29. A reaction product consisting of castor oil containing more than one 1,3-dioxolane residue.

30. A reaction product consisting of tall oil containing more than one 1,3-dioxolane residue.

DONALD JOHN LODER.
WILLIAM FRANKLIN GRESHAM.